United States Patent [19]

Leedom

[11] 4,049,280
[45] Sept. 20, 1977

[54] PICKUP CARTRIDGE

[75] Inventor: Marvin Allan Leedom, South Brunswick Township, Middlesex County, N.J.

[73] Assignee: RCA Corporation, New York, N.Y.

[21] Appl. No.: 667,308

[22] Filed: Mar. 16, 1976

[30] Foreign Application Priority Data

Sept. 18, 1975 United Kingdom ............... 38458/75
Nov. 28, 1975 United Kingdom ............... 49109/75

[51] Int. Cl.² .......................................... G11B 3/02
[52] U.S. Cl. ............................. 274/37; 179/100.1 B; 358/128
[58] Field of Search ................. 274/37, 23 R, 23 A; 178/6.6 R, 6.6 A, 6.6 DD; 358/128; 179/100.1 B

[56] References Cited

U.S. PATENT DOCUMENTS 3,952,147  4/1976  Leedom ........................... 274/23 A
3,961,131  6/1976  Taylor ............................. 178/6.6 R Primary Examiner—Steven L. Stephan
Attorney, Agent, or Firm—Eugene M. Whitacre; William H. Meagher; Dilip A. Kulkarni

[57] ABSTRACT

A pickup cartridge for a video disc player encloses a stylus arm unit comprising a stylus arm carrying a stylus at one end thereof. A connector plate is secured to the other end of the stylus arm via a compliant member. A spring at the stylus carrying end of the stylus arm releasably retracts the stylus arm to a position within the confines of the cartridge. A diaphragm flexibly suspends the connector plate in the cartridge at an angular orientation relative to the cartridge so that, when the stylus arm is held in the retracted position in the cartridge, the compliant member is not under stress. When the cartridge is installed in the video disc player, a support member engages the connector plate to change its orientation with respect to the cartridge such as to permit the stylus to be moved to protrude outside the confines of the cartridge without bending or stressing the compliant member.

11 Claims, 14 Drawing Figures

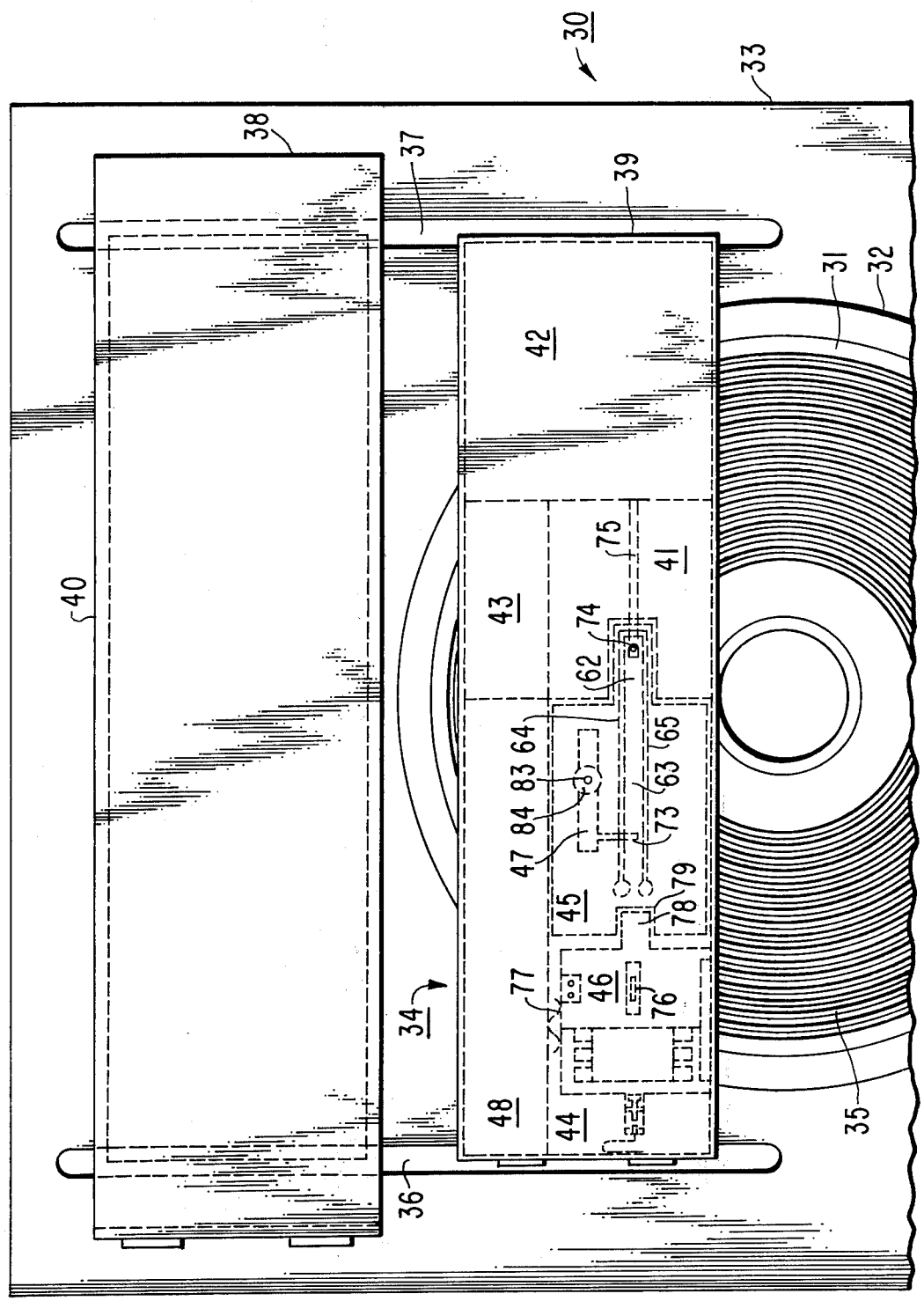

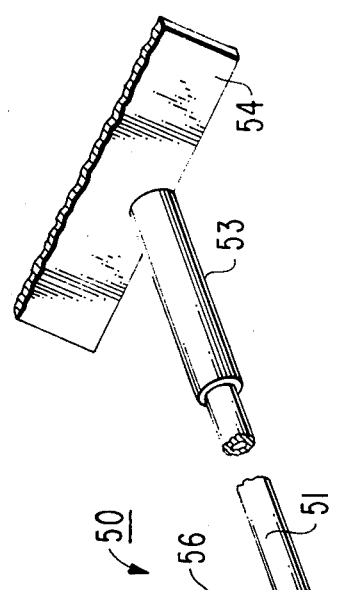 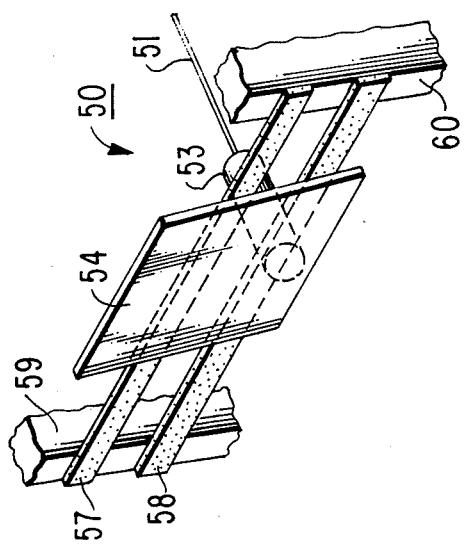 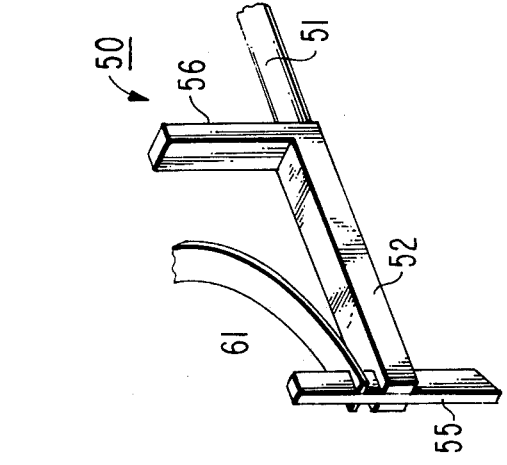 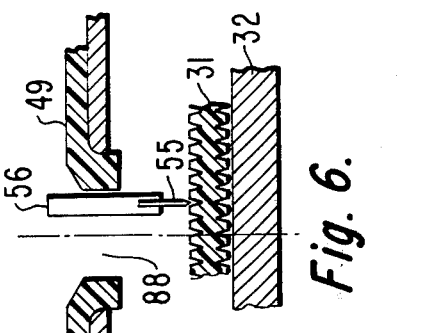 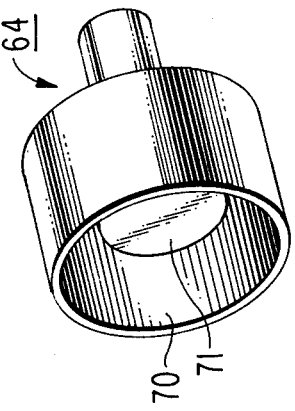 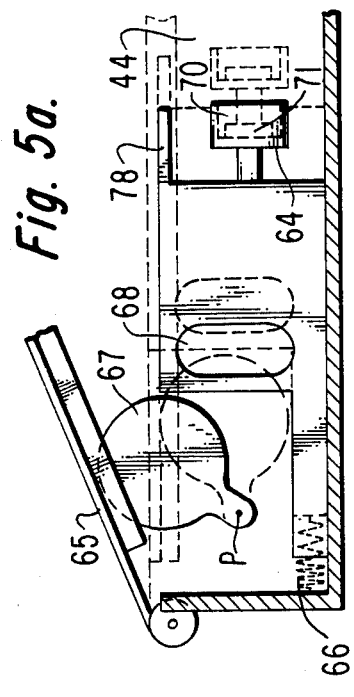 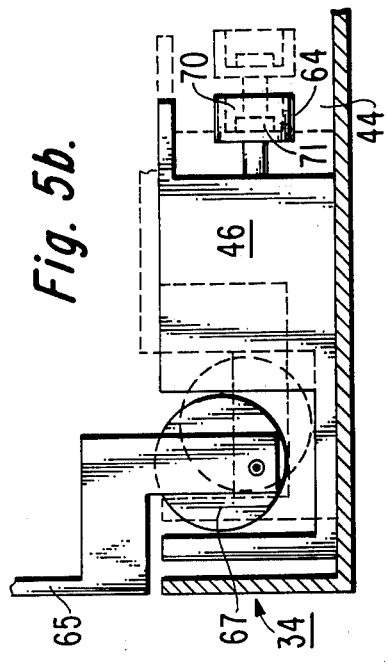

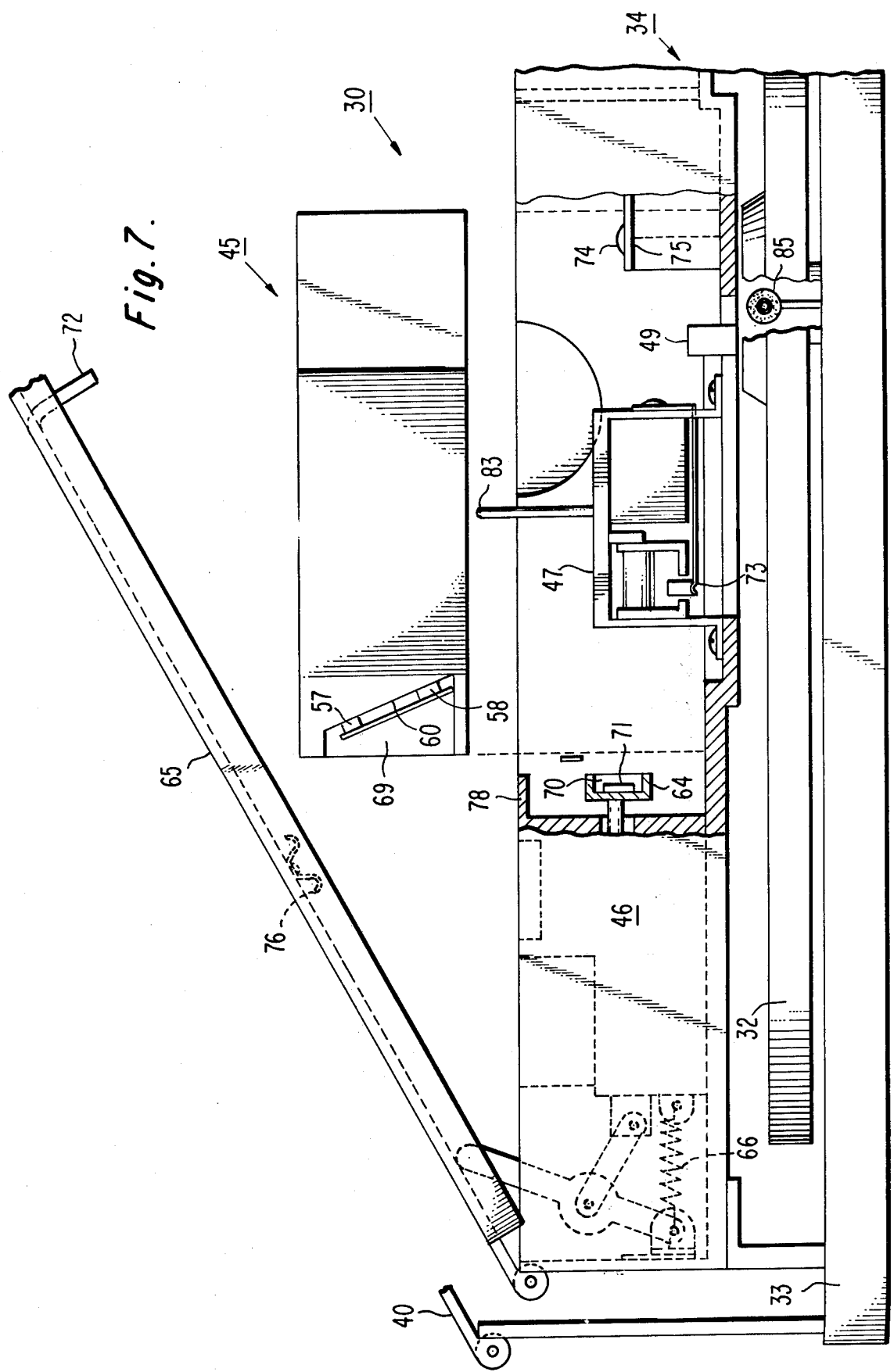

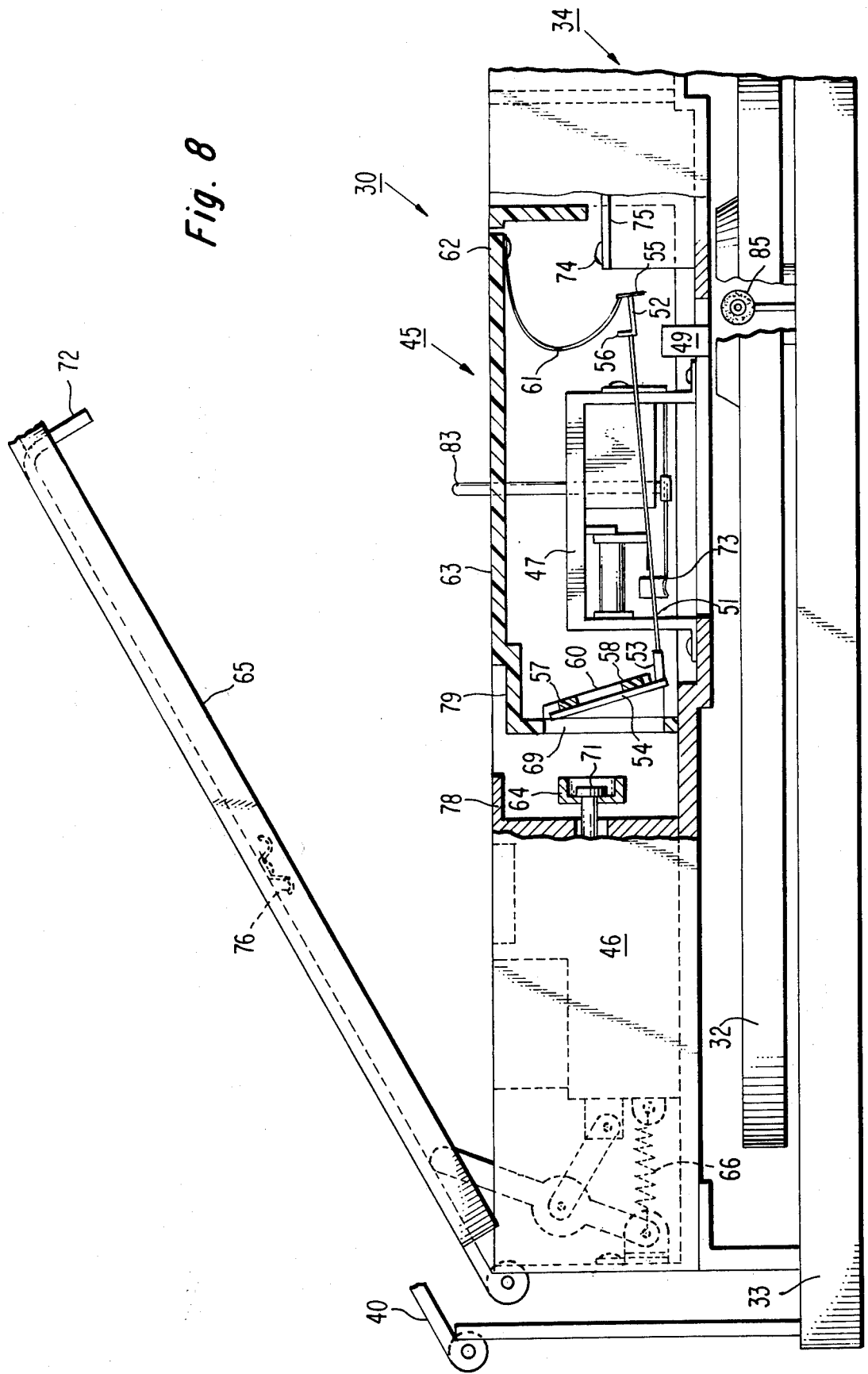

PICKUP CARTRIDGE

The invention relates to a cartridge enclosing a stylus arm unit suitable for use in a video disc player.

In a video disc system of the type described in the U.S. Pat. No. 3,842,194, a stylus arm, carrying a stylus at one end and a connector plate secured to its other end via a compliant member, may advantageously be treated as a replaceable unit of a size convenient to handle, whereby when the stylus wear calls for a replacement, the user may readily remove and replace the stylus arm unit without requirements for mechanical skill and dexterity.

In copending U.S. Applications of (1) M. A. Leedom, Ser. No. 522,815, now U.S. Pat. No. 3,952,147, and (2) J. A. Allen, Ser. No. 522,821, now U.S. Pat. No. 3,952,145, replaceable cartridges for enclosing the stylus are unit are disclosed. In these cartridges, the stylus arm occupies on of the following positions: (a) a retracted storage position outside the player, (b) a retracted off-record rest position while installed in the player, and (c) a protruding above-record play position also while installed in the player. In the retracted positions, the compliant member is stressed and has a tendency to form a permanent "set." Formation of a permanent "set" in the compliant member is undesirable because it causes stylus mistracking during playback. An improved stylus are cartridge which overcomes aforementioned problems is herein disclosed.

In accordance with the principles of the present invention, a pickup cartridge for a video disc player is provided. A stylus arm unit comprises a stylus arm carrying a stylus at one end and a connector plate secured to its other end via a compliant member. A flexible diaphragm suspends the connector plate at an angular orientation with respect to the cartridge such that the stylus arm, in the absence of forces thereon, tends to project within the confines of the cartridge. The connector plate is adapted to be rotated upon reception of the cartridge in the player to a position such that the stylus arm, in the absence of other forces, tends to project outside the confines of the cartridge.

In the accompanying drawings:

FIG. 1 is a video disc player incorporating a pickup cartridge embodying the present invention;

FIG. 2 is a perspective view of a stylus arm unit housed in the cartridge of FIG. 1;

FIG. 3 is a perspective view of an arrangement used for suspending the stylus arm unit of FIG. 2 in the cartridge of FIG. 1;

FIG. 4 is a support member located in a carriage of the video disc player of FIG. 1 for engagement with a connector plate of the stylus arm unit of FIGS. 2 and 3;

FIGS. 5a and 5b illustrate two embodiments of an apparatus for moving an armstretcher apparatus located in the carriage for effecting engagement of the support member of FIG. 4 with the connector plate of FIGS. 2 and 3;

FIG. 6 illustrates a locked groove escape apparatus for moving a groove-riding stylus out of a locked groove of a record;

Figure 11:
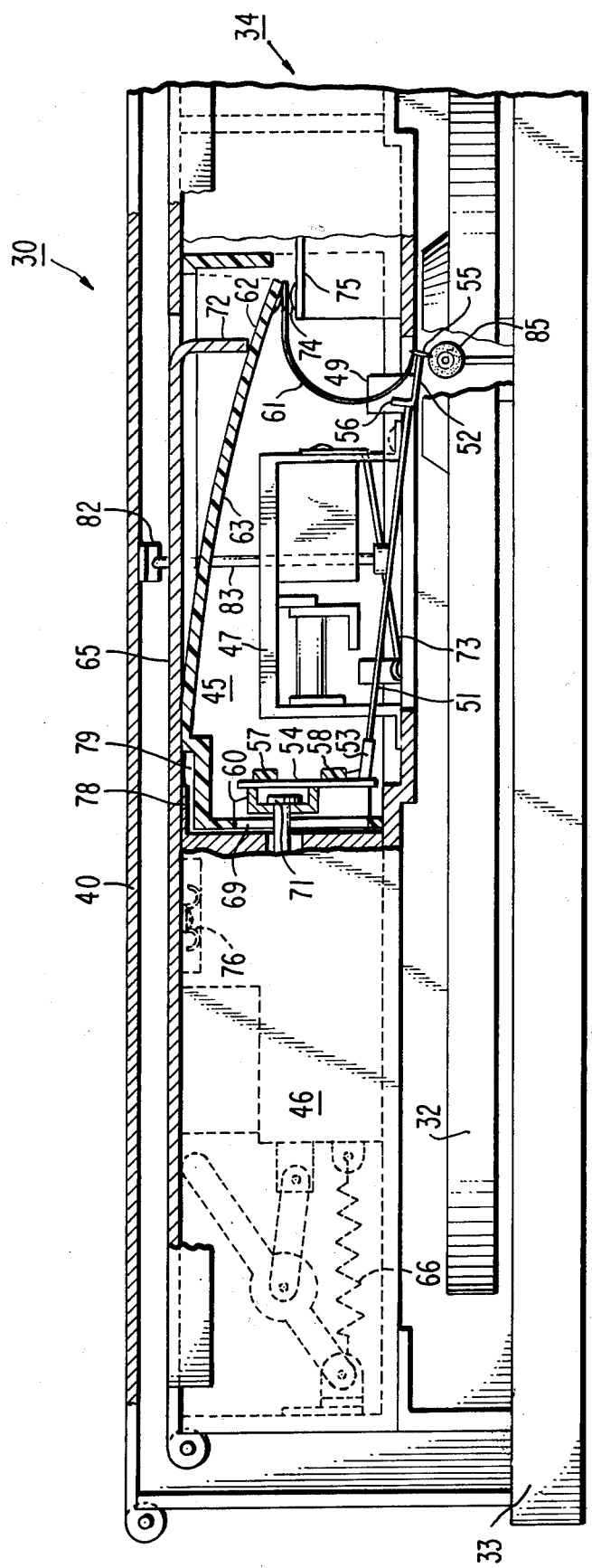
Figure 12:
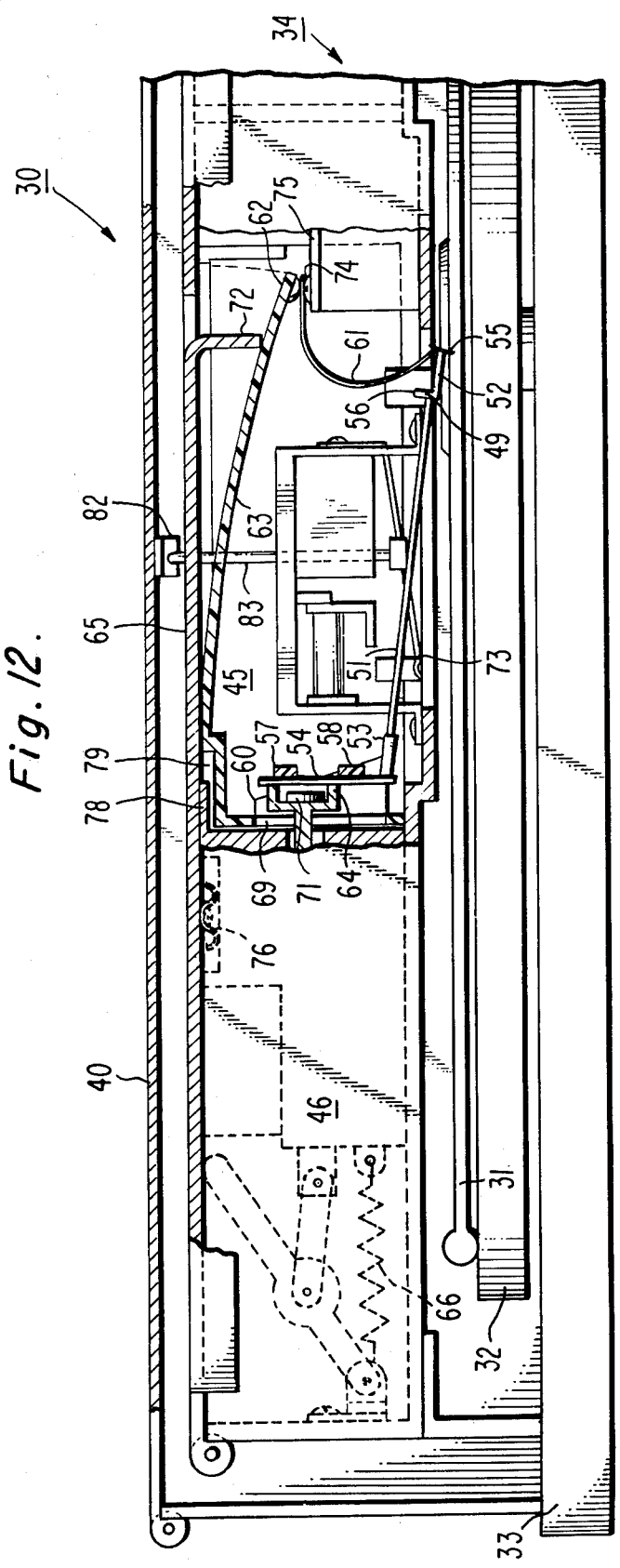
Figure 13:
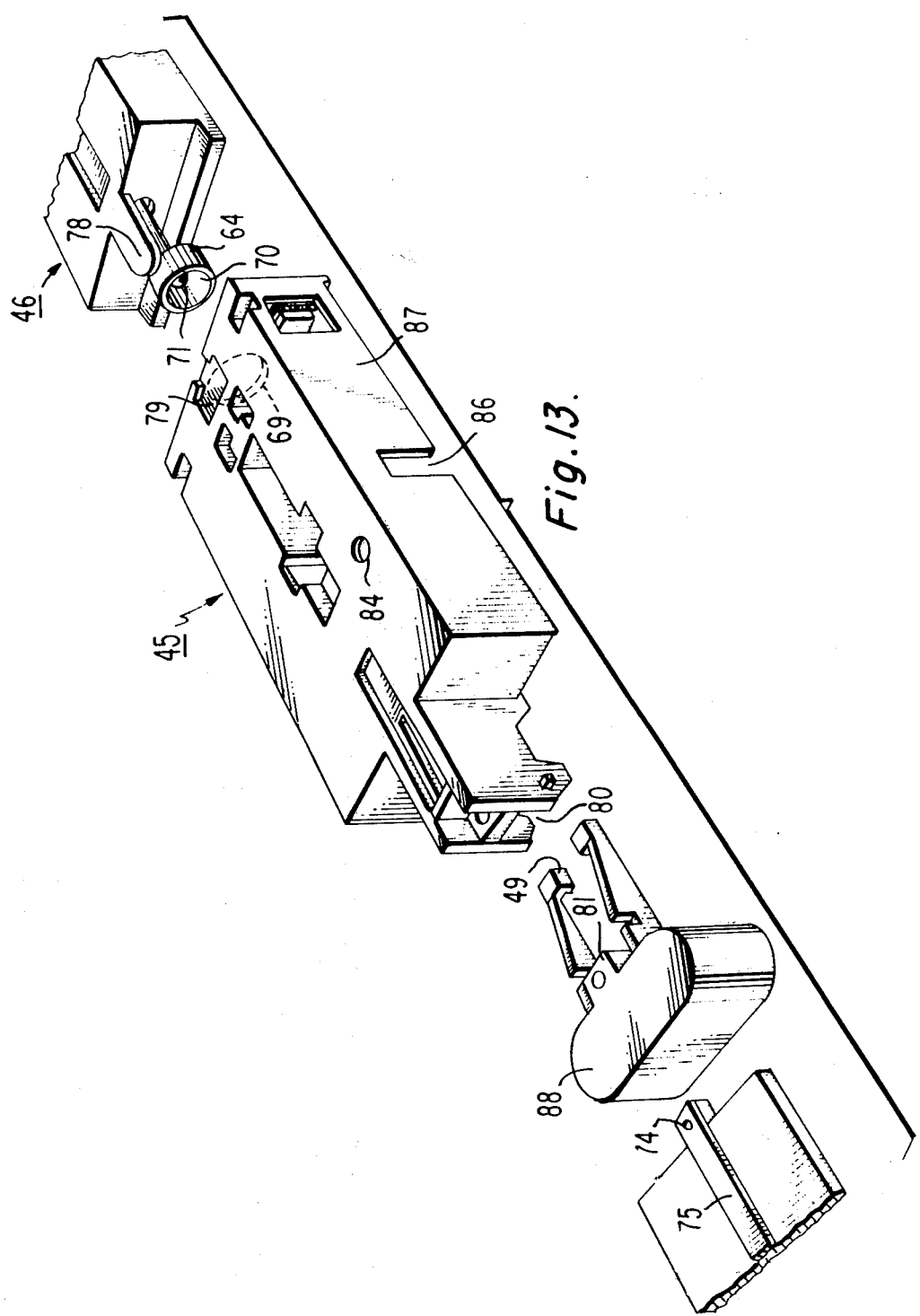

FIGS. 7-12 illustrate, a seriatim, operations involved in installing the cartridge in the carriage of the video disc player of FIG. 1; still another embodiment of the apparatus for moving the armstretcher apparatus located in the carriage being illustrated in FIGS. 7-12; and FIG. 13 is an exploded perspective view of an arrangement of some of the parts in the carriage of FIGS. 7-12, including a cartridge modification.

In FIG. 1, numeral 30 indicates a video disc player of the general type shown in the U.S. Pat. No. 3,842,194 (Clemens). A record 31 is rotatably mounted for playback on a turntable 32 secured to a motorboard 33. A carriage 34 is mounted for lateral motion relative to the motorboard 33 in correlation with lateral motion of a stylus 55 (FIG. 2) riding in a spiral-groove 35 disposed on the surface of the record 31 during playback. Slots 36 and 37 are provided in the motorboard 33 to permit lateral motion of the carriage 34 from an off-record rest position 38 to an above-record play position 39. Reference may be made to the U.S. Pat. No. 3,870,835 (Stave) for illustration of an apparatus for laterally driving the carriage 34 in correlation with the groove-riding stylus 55 during playback. When the carriage 34 is in the off-record rest position 38, a hinged plate 40 overlies the carriage.

There are five basic chambers in the carriage 34. Chambers 41, 42, and 43 are for enclosing respective circuit boards for respective elements of the signal processing circuitry of the playback system: (a) resonator (forming a tuned circuit with the stylus electrode/record capacitance), (b) oscillator (supplying UHF oscillations to the tuned circuit), and (c) preamplifier (responding to the detected version of modulated oscillations derived from the tuned circuit). Chamber 44 contains a replaceable pickup cartridge 45, a retractable armstretcher 46, and a stylus arm lifter 47. The armstretcher may be of the type shown in U.S. Pat. No. 3,711,641 (Palmer). Chamber 48 forms a wiring channel to hold the lead wires to the various circuit boards.

The cartridge 45 houses an insert molded stylus arm unit 50 shown in FIG. 2. The insert molded stylus arm unit 50 consists of a stylus arm 51 formed of an aluminum tube (e.g., 0.024 inch outer diameter and 0.002 inch thickness) with a plastic stylus holder 52 glued at one end of the stylus arm and a compliant member 53 molded at the other end of the stylus arm to connect the stylus arm with a metal connector plate 54. The compliant member 53 is in unstressed condition when it is aligned with the stylus arm 51. The angle between the stylus arm 51 and the connector plate 54 is 94° for reasons given subsequently. The plastic stylus holder 52 contains a slot to hold the stylus 55 when it is glued in place. A small projection 56 is molded at the top of the plastic stylus holder 52 to engage with an abutment 49 (FIG. 6) to relieve the stylus 55 from a locked groove of the record 31.

The arrangement for suspending the stylus arm unit 50 in the cartridge 45 will now be explained with reference to FIGS. 3 and 4. As shown in FIG. 3, a pair of elastic straps 57 and 58 are glued to the connector plate 54 of the stylus arm unit 50. The elastic straps 57 and 58 are secured to a pair of slanted bearing surfaces 59 and 60 provided at the rear end of the cartridge 45. The slanted rear bearing surfaces 59 and 60 establish an 8° angle between the connector plate 54 and a direction perpendicular to the bottom surface of the cartridge 45. FIG. 7 shows the slanted bearing surface 60.

The cartridge 45 further includes a leaf spring 61, in the form of a conductive ribbon, for urging the stylus 55 into the record groove 35 during playback as shown in FIG. 12. One end of the leaf spring 61 is secured to the stylus 55 in electrical contact with an electrode included in the stylus. The other end of the leaf spring 61 is secured to the free end 62 of a cantilever beam 63. Slots 64 and 65 in the top wall of the cartridge 45, as shown in FIG. 1, allow a strip-like portion of the top wall to function as the cantilever beam. While in this particular embodiment the cantilever beam 63 is integral with the cartridge 45, it could be separately secured to the top wall of the cartridge.

The location of the free end 62 of the cantilever beam 63 with respect to the bottom surface of the cartridge 45 and the configuration of the leaf spring 61 are such that the stylus arm 51 is retained in a retracted position within the cartridge for protection (FIG. 8). The retracted position provides a location for the stylus 55 withdrawn within the confines of the cartridge 45 remote from an opening in the bottom surface of the cartridge through which the stylus protrudes when the carriage 34 is in the off-record rest position 38 (FIG. 11) and above-record play position (FIG. 12).

When the cartridge 45 is outside the player (FIG. 7), or when inside the player but not engaged with the armstretcher 46 (FIG. 8), the stylus arm 51 is held in a retracted position in the cartridge for protection. In either of these positions, the compliant member 53 is not bent or stressed, and therefore, the formation of a permanent "set" in the compliant member, which could cause mistracking of the stylus 55 during playback, is prevented.

FIGS. 7-12 illustrate, a seriatim, operations involved in installation of the cartridge 45 in the carriage compartment 44. From FIG. 7, it can be seen that armstretcher 46 has a support member 64 for engagement with the connector plate 54 of the cartridge 45 during containment thereof in the carriage compartment 44. The armstretcher 46 is slidably mounted in the carriage compartment 44 for movement between a withdrawn position when a lid 65 of the carriage is open (FIG. 7) and an advanced position when the carriage lid is closed (FIGS. 10-12) in response to the motion of the carriage lid. A coil spring 66 connected between the armstretcher 46 and the carriage 34 returns the armstretcher to the withdrawn position when the carriage lid 65 is opened.

An apparatus for traversing the armstretcher 46 in the carriage compartment 44 to effect rigid engagement between the support member 64 and the connector plate 54 is shown in FIG. 5a. A cam 67 is mounted in the carriage 34 for rotation about a pivot pin P in response to the motion of the carriage lid 65. The peripheral surfaces of the cam 67 engage the armstretcher 46 to cause relative displacement between the armstretcher and the carriage 34. A portion 68 in the armstretcher 46 is relieved to permit a small amount of overtravel by the cam 67. Further, relief 68 helps to spring load the armstretcher 46 against the cartridge 45, when the carriage lid 65 is closed, to assure accurate positioning of the cartridge in the carriage compartment. Additionally, the relief 68 tolerates a slight variation in the dimensions of the armstretcher 46, cartridge 45, and the carriage compartment 44.

The operation of another embodiment of the apparatus for moving the armstretcher 46 in the carriage compartment 44 to effect rigid engagement between the support member 64 and the connector plate 54 can be seen from FIG. 5b. The operation of the moving apparatus of FIG. 5b is similar to the moving apparatus of FIG. 5a except that in the moving apparatus of FIG. 5b the return spring 66 is not required. In the moving apparatus of FIG. 5b, the carriage lid 65 and the cam 67 are fixedly secured to a pivot pin which is rotatably mounted in the carriage 34. When the carriage lid 65 is opened, the cam 67 is rotated to retract the armstretcher 46 to the withdrawn position.

The operation of still another embodiment of the apparatus for moving the armstretcher 46 in the carriage compartment 44 to effect rigid engagement between the support member 64 and the encounter plate 54 can be seen from FIGS. 8-12.

The cartridge 45 is placed in the carriage compartment 44 as shown in FIG. 8, and the carriage lid 65 is closed. The cartridge 45 overlies the stylus arm lifter 47 during containment of the cartridge in the carriage compartment 44.

Figure 9:
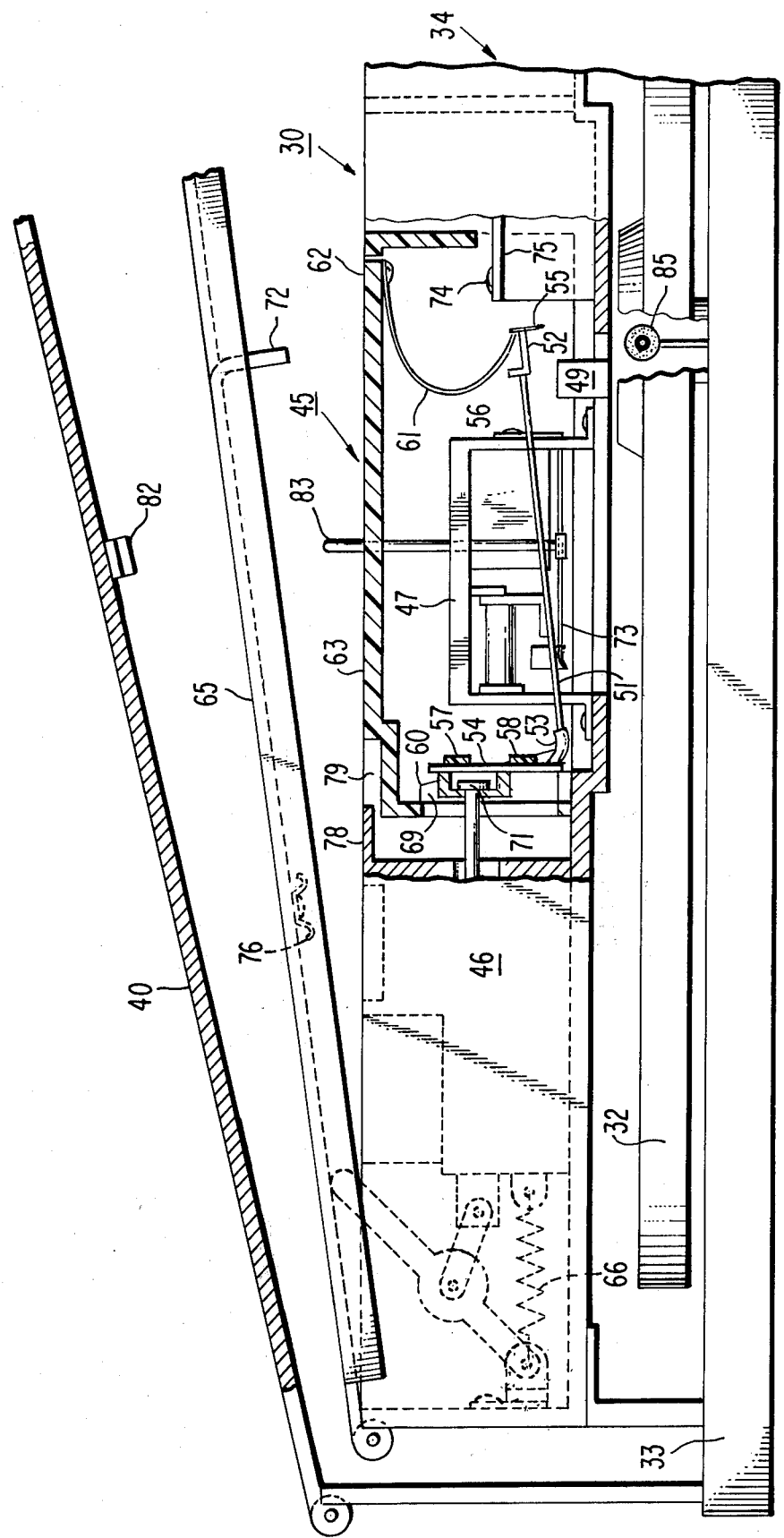

The support member 64 enters the interior of the cartridge 45 through an opening 69 at the rear end of the cartridge for engagement with the connector plate 54 as shown in FIG. 9. As the armstretcher moves forward, the support member 64 moves the connector plate 54 from the initial tilted position (e.g., 8° as shown in FIG. 8) to a position matching the engaging surface of the support member (e.g., perpendicular to the bottom surface of the cartridge 45 as shown in FIG. 9). The elastic straps 57 and 58 permit the connector plate 54 to assume the new orientation. The connector plate 54 is made from magnetizable material. The support member 64 is also magnetizable. The support member 64 has walls defining a recess 70 as shown in FIG. 4. A permanent magnet 71 is centrally mounted in the recess 70. The flux of the permanent magnet 71 secures the connector plate 54 to the support member 64 for rigidly transmitting cyclical motion of the support member to the connector plate during the support member/connector plate engagement. The separation between the permanent magnet 71 and the connector plate 54 is made greater than the separation between the permanent magned and the walls of the support member 64 so that the strongest magnetic field is in the annular cavity. The magnetic field in the annular cavity attracts any stray magnetic particles present in the vicinity away from the mating surfaces of the connector plate 54 and the support member 64. Such an arrangement assures rigid connection between the support member 64 and the connector plate 54 as explained in more detail in a concurrent filed, copending U.S. Patent application, Ser. No. 667,388, of M. A. Leedom.

Figure 10:
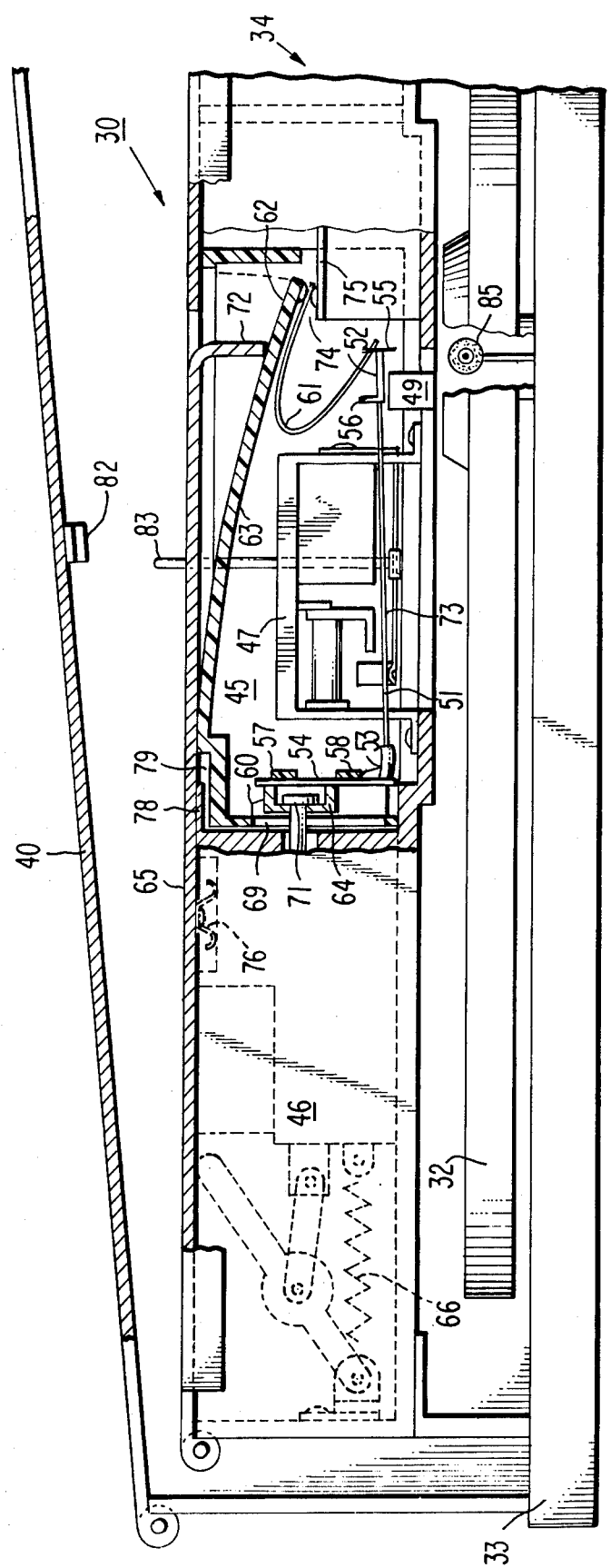

As the carriage lid 65 is closed further, a defeat lever 72 depresses the free end 62 of the cantilever beam 63, as shown in FIG. 10. This lowers the leaf spring 61 to allow the stylus arm 51 to rest on a control rod 73 of the stylus arm lifter 47.

The end of the leaf spring 61 affixed to the cantilever beam 63 is urged against a contact rivet 74 provided on a resonator circuit board 75 to establish an electrical path between the stylus electrode and the signal processing circuit via the leaf spring.

When the carriage lid 65 is closed, a spring 76, secured to the carriage compartment 44 to establish proper seating of the armstretcher as shown in FIG. 10. From FIG. 1, it can be seen that a spring 77, secured to the carriage compartment 44, presses the armstretcher 46 against the side wall of the carriage compartment to assure lateral alignment of the armstretcher.

The engagement of the defeat lever 72 with the cartridge 45 assures proper seating of the cartridge in the carriage compartment 44. In order to assure lateral alignment of the rear end of the carriage 45 with the armstretcher 46, the armstretcher has a projection 78 which enters a recess 79 provided in the rear end of the cartridge during relative motion between the armstretcher and the cartridge as shown in FIG. 13.

Further, in order to assure lateral alignment of the front end of the cartridge 45 with the contact rivet 74, the cartridge has a cavity 80 at the front end for receiving a portion 81 provided in a structure 88 associated with the resonator circuit board 75 during relative motion between the cartridge and the stylus housing 34 as shown in FIG. 13.

When the hinged plate 40 is closed, a projection 82 depresses a plunger 83 connected to the rod 73 of the stylus arm lifter 47. An aperture 84 is provided at the top of the cartridge 45 to permit passage of the plunger 83 as shown in FIG. 1.

When the carriage 34 is in the off-record rest position 38 under the plate 40, the plunger 83 depresses the stylus arm lifter rod 73 as shown in FIG. 11 and the stylus rests on a stylus brush 85. Further, when the carriage 34 moves from the off-record rest position 38 to the above-record play position 39, the stylus arm lifter rod 73 lifts the stylus arm 51 as depression of the plunger 83 is no longer obtained by the projection 82. Again, when the carriage 34 reaches the above-record play position 39, the stylus arm lifter 47 is activated to permit the stylus 55 to rest on the record 31.

The stylus arm lifting/lowering arrangement may be of the type disclosed in a copending U.S. Application of M. A. Leedom, et al., Ser. No. 667,309, entitled, "STYLUS ARM LIFTING/LOWERING APPARATUS FOR A VIDEO DISC PLAYER," filed concurrently herewith.

When the stulus 55 is resting on the stylus brush 85 or the record 31, the compliant member is not bent or stressed. This feature prevents formation of a set in the compliant member during containment of the cartridge 45 in the carriage compartment 44. Thus, compliant member is in unstressed condition while the cartridge is outside the carriage compartment, and also while the cartridge is contained in the carriage compartment and the carriage is in the off-record rest position or in the above-record play position. The compliant member is stressed only in the interval between the off-record rest position and the above-record play position of the carriage (FIG. 10) as the stylus arm is lifted to permit the stylus to clear the outside bead of the record. This interval is so short that it has no noticeable effect on the "set" of the complaint member.

An aperture 86 (FIG. 13) is the outer wall 87 of the cartridge 45 permits passage of wiring between the stylus arm lifter 47 and the wiring channel 48. The cartridge 45 is provided with inner walls closely flanking the stylus arm unit 50 to limit access thereto. The keyed end shape and the solid cover of the cartridge 45 prevents backward or inverted insertion of the cartridge into the stylus housing compartment 44.

Arragement for relieving the stylus 55 from a locked groove in the record 31 during playback will now be explained with reference to FIGS. 2 and 6. The stylus holder 52 is molded from compliant plastic material with the deflector 56 molded at the top. The deflector 56 is disposed in a direction substantially perpendicular to the surface of the turnable 32 when the stylus arm is lowered for playback as shown in FIG. 6. When the stylus 55 encounters a locked groove in the record 31 during playback, its radial position remains substantially unchanged while the carriage 34 traverses radially inward toward the axis of rotation of the record thereby reducing the spatial separation between the abutment 49 and the deflector 56. When the abutment 49 engages the deflector 56, it pushes the deflector radially inward whereby the stylus 55 is relieved from a locked groove of the record.

Where the record 31 is rotating at 450 rpm, where the record has 5,555 groove convolutions per inch, and where the separation between the deflector 56 and the abutment 49 is of the order of 0.010 inches, approximately 7 seconds would elapse between the time when the stylus 55 encounters a locked groove in the record and the time when the abutment engages the deflector to relieve the stylus from the locked groove. During the 7 second interval, the stylus 55 would be repetitively scanning the same groove (i.e., locked groove) in the record 31 which could be annoying to the viewer. It is desirable, for effecting immediate relief of the stylus 55 from the locked groove, to consistently locate the deflector 56 very close to the abutment 49 when the cartridge 45 is installed in the carriage compartment 44 and the stylus arm 51 is lowered for playback. To assure very precise and consistent positioning of the deflector 56 with respect to the abutment 49 during playback, the abutment 49 is made integral with the structure 88 having the portion 81 which is received in the cavity 80 at the front end of the cartridge 45 as shown in FIG. 13. Accurate positioning (1) of the abutment 49 with respect to the structure 88, (2) of the cartridge 45 with respect to the structure 88, and (3) of the deflector 56 with respect to the cartridge assures an accurate and consistent relationship between the deflector and the abutment during playback to give excellent operating results in that locked grooves are relieved quickly.

In the exploded perspective view of FIG. 13, the carriage supported elements (e.g., the armstretcher 46, circuit board 75, structure 88, etc.) are shown in cooperation with a modified version of the cartridge of FIGS. 1 and 7-12. The modified cartridge is explained in more detail in a concurrently filed, copending U.S. Pat. application, Ser. No. 667,420, of J. A. Allen.

What is claimed is:

1. A pickup cartridge for a video disc player comprising:
   A. a stylus arm unit including:
      a. a stylus;
      b. a stylus arm carrying said stylus at one end therof;
      c. a connector plate; and
      d. a compliant member securing said connector plate to the other end of said stylus arm;
   B. a cartridge having walls defining a protective enclosure for said stylus arm unit; and
   C. means, including a flexible diaphragm secured to said connector plate, for flexibly suspending said connector plate within said cartridge at a first angular orientation with respect to said cartridge such that said compliant member is unstressed when said stylus arm occupies a retracted position within the confines of said cartridge while said connector plate is held in said first angular orientation;
   said connector plate being adapted to be rotated when said cartridge is mounted in said player to a second angular orientation such that said compliant member is also unstressed when said stylus projects outside the confines of said cartridge while said connector plate is held in said second angular orientation.

2. An apparatus comprising:

A. a stylus arm unit including:
  a. a stylus;
  b. a stylus arm carrying said stylus at one end thereof;
  c. a connector plate; and
  d. a compliant member securing said connector plate to the other end of said stylus arm;
B. a cartridge having walls defining a protective enclosure for said stylus arm unit and an opening in said cartridge through which said stylus may protrude;
C. means secured to said cartridge for releasably retracting said, stylus arm within the confines of said cartridge remote from said opening in said cartridge; and
D. means, including a flexible diaphragm secured to said connector plate, for flexibly suspending said connector plate within said cartridge at a first angular orientation with respect to said cartridge such that said compliant member is unstressed when said stylus arm is held in said retracted position in said cartridge while said connector plate occupies said first angular orientation;
said connector plate being adapted to be rotated to a second angular orientation such that said compliant member is unstressed when said stylus protrudes outside the confines of said cartridge to a record engaging level during release of said retracting means while said connector plate is held in said second angular orientation.

3. In a system for playing back prerecorded signals from a spirally grooved record; said system including a support element having a compartment for a removable pickup cartridge and a cooperating member; the combination comprising:
A. a stylus arm unit including:
  a. a stylus arm carrying a stylus at one end thereof;
  b. a connector plate; and
  c. a compliant member securing said connector plate to the other end of said stylus arm;
B. a cartridge having walls defining a protective enclosure for said stylus arm unit and an opening in said cartridge through which said stylus may protrude; said cartridge being subject to reception in said compartment provided in said support element;
C. means secured to said cartridge for releasably retracting said stylus arm within the confines of said cartridge remote from said opening in said cartridge; and
D. means, including a flexible diaphragm secured to said connector plate, for flexibly suspending said connector plate within said cartridge at a location permitting engagement thereof with said cooperating member secured to said support element when said cartridge is received in said compartment; said diaphragm being secured to said cartridge in a manner that establishes a first angular orientation of said connector plate with respect to said cartridge so that said compliant member is unstressed when said stylus arm is held in said retracted position within aid cartridge while said connector occupies said first angular orientation;
wherein the angular orientation of said connector plate with respect to said cartridge when said connector plate is rigidly engaged with said cooperating member during containment of said cartridge in said compartment, and the angular orientation of said compliant member with respect to said connector plate, are such that said compliant member is unstressed when protrusion of said stylus through said opening to a record engaging level is effected during release of said retracting means while said connector plate and said cooperating member are engaged.

4. A combination as defined in claim 3 further including means secured to said support element for defeating said releasable retracting means for permitting protrusion of said stylus through said opening when said cartridge is received in said compartment and when said connector plate is in engagement with said cooperating member.

5. In a system for playing back prerecorded signals from a spirally grooved record; said system including a support element having a compartment for a removable pickup cartridge; the combination comprising:
A. a stylus arm unit including:
  a. a stylus arm carrying a stylus at one end thereof;
  b. a connector plate; and
  c. a compliant member securing said connector plate to the other end of said stylus arm;
B. a cartridge having walls defining a protective enclosure for said stylus arm unit and an opening in said cartridge through which said stylus may protrude; said cartridge being subject to reception in said compartment provided in said support element;
C. means for releasably retracting said stylus arm within the confines of said cartridge remote from an opening in said cartridge wherein said releasable retracting means comprises:
  a. a spring for urging said stylus into said record groove during playback; wherein a first end of said spring is secured to said stylus; and
  b. a cantilever member secured to the top wall of said cartridge; wherein a second end of said spring is secured adjacent to the free end of said cantilever member; wherein said stylus arm is held in a retracted position for a first position of said cantilever member and wherein said stylus is released from said retracted position for a second position of said cantilever member;
D. means, including a flexible diaphragm secured to said connector plate, for flexibly suspending said connector plate within said cartridge at a location permitting engagement thereof with a cooperating member secured to said support element when said cartridge is received in said compartment; said diaphragm being secured to said cartridge in a manner that establishes a first angular orientation of said connector plate with respect to said cartridge so that said compliant member is unstressed when said stylus arm is held in said retracted position within said cartridge while said connector plate occupies said first angular orientation; and
E. means secured to said support element for defeating said releasable retracting means;
wherein the angular orientation of said connector plate with respect to said cartridge when said connector plate is rigidly engaged with said cooperating member during containment of said cartridge in said compartment, and the angular orientation of said complaint member with respect said connector plate, are such that said compliant member is unstressed when said protrusion of said stylus through said opening to a record engaging level is effected during defeat of said retracting means while said connector plate and said cooperating member are engaged.

6. In a system for playing back prerecorded signals from a spirally grooved record; said system including a support element for a removable pickup cartridge; the combination comprising:
  A. a stylus arm unit including:
    a. a stylus arm carrying a stylus at one end thereof;
    b. a connector plate; and
    c. a compliant member securing said connector plate to the other end of said stylus arm;
  B. a cartridge having walls defining a protective enclosure for said stylus arm unit; said cartridge being subject to reception in a compartment provided in said support element;
  C. means for releasably retracting said stylus arm within the confines of said cartridge remote from an opening in said cartridge through which said stylus may otherwise protrude; said releasable retracting means comprising:
    a. a spring for urging said stylus into said record groove during playback; wherein a first end of said spring is secured to said stylus; and
    b. a cantilever member secured to the top wall of said cartridge; wherein a second end of said spring is secured adjacent to the free end of said cantilever member; wherein said stylus arm is held in a retracted position for a first position of said cantilever member; and wherein said stylus is released from said retracted position for a second position of said cantilever member;
  D. means, including a flexible diaphragm secured to said connector plate, for flexibly suspending said connector plate within said cartridge at a location permitting engagement thereof with a cooperating member secured to said support element when said cartridge is received in said compartment; said diaphragm being secured to said cartridge in a manner that establishes a first angular orientation of said connector plate with respect to said cartridge so that said complaint member is unstressed when said stylus arm is held in said retracted position within said cartridge while said connector plate occupies said first angular orientation; and
  E. means secured to said support element for defeating said releasable retracting means;
wherein the angular orientation of said connector plate with respect to said cartridge when said connector plate is rigidly engaged with said cooperating member during containment of said cartridge in said compartment, and the angular orientation of said compliant member with respect to said connector plate, are such that said compliant member is unstressed when said protrusion of said stylus through said opening to a record engaging level is effected during defeat of said retracting means while said connector plate and said cooperating member are engaged;
wherein said defeating means comprises a lever secured to a lid of said support element; and
wherein the location of said lever is such that it depresses said free end of said cantilever member to said second position when said support element lid is closed.

7. A combination as defined in claim 6 wherein an input terminal of a signal processing circuit is secured to said support element; wherein said stylus includes an electrode; wherein said stylus spring is conductive; wherein said securing of said first end of said stylus spring to said stylus effects an electrical connection between said stylus electrode and said first end of said stylus spring; wherein the location of said input terminal with respect to said support element is such that said depression of said free end of said cantilever spring during containment of said cartridge in said compartment effects an electrical connection between said second end of stylus spring and said input terminal to establish an electrical path between said stylus electrode and said signal processing circuit through said conductive leaf spring.

8. A combination as defined in claim 7 wherein said support element comprises a carriage mounted for lateral motion relative to a base plate of said system in correlation with lateral motion of said stylus in said record groove during playback.

9. A combination as defined in claim 8 further including means for imparting cyclical motion to said cooperating member in a manner that opposes deviations of stylus/record relative velocity from a predererimined speed.

10. In a system for playing back prerecorded signals from a spirally grooved record disposed on the surface of a turntable rotatably mounted with respect to a base of said system; said system including a carriage mounted for lateral motion relative to said base; said carriage having an opening; said system further including means for causing lateral motion of said carriage in correlation with, but independent of, lateral motion of a groove-riding stylus during playback; a stylus arm; a cooperating member located in said carriage an apparatus comprising:
  A. a flexible coupler securing one end of said stylus arm to said cooperating member located in said carriage;
  B. an abutment mounted within said carriage; and
  C. a compliant stylus holder carrying aid groove-riding stylus; wherein said compliant stylus holder is rigidly secured to the other end of said stylus arm; wherein said compliant stylus holder has a projecting portion which is disposed in a direction substantially perpendicular to said turntable surface; wherein the location of said projecting portion, when said stylus arm is lowered to permit said stylus to protrude through said opening in said carriage for record engagement, with respect to said carriage is such that said projecting portion engages said abutment secured to said carriage when said stylus encounters a locked groove in said record during playback to effect radially inward movement of said stylus thereby relieving said stylus from said locked groove.

11. A system as defined in claim 10 wherein said flexible coupler is mounted within a protective cartridge; wherein said carriage has a compartment for releasably receiving said cartridge such that said securing of said stylus arm to said cooperating member is achieved during recption of said cartridge in said compartment; wherein said abutment has a portion for engagement with said cartridge so as to accurately locate said cartridge within said compartment upon said cartridge reception.

* * * * *

UNITED STATES PATENT OFFICE
CERTIFICATE OF CORRECTION

PATENT NO. : 4,049,280
DATED : SEPTEMBER 20, 1977
INVENTOR(S) : MARVIN ALLAN LEEDOM

It is certified that error appears in the above-identified patent and that said Letters Patent are hereby corrected as shown below:

| | |
|---|---|
| Column 4, line 8 | change "encounter" to --connector-- |
| Column 4, line 37 | change "magned" to --magnet-- |
| Column 4, line 45 | change "concurrent" to --concurrently-- |
| Column 4, line 58 | after "carriage" add --lid, presses the arm stretcher 46 down into the carriage-- |
| Column 7, line 61 [Claim 3 (D)] | change "aid" to --said-- |
| Column 8, line 41 [Claim 5 (C)] | after "member" insert --;-- |
| Column 10, line 40 [Claim 10 (C)] | change "aid" to --said-- |

Signed and Sealed this

Twenty-second Day of August 1978

[SEAL]

Attest:

RUTH C. MASON
Attesting Officer

DONALD W. BANNER
Commissioner of Patents and Trademarks